(12) United States Patent
Zhou et al.

(10) Patent No.: US 12,561,989 B2
(45) Date of Patent: *Feb. 24, 2026

(54) VEHICLE LOCALIZATION BASED ON LANE TEMPLATES

(71) Applicant: PlusAI, Inc., Santa Clara, CA (US)

(72) Inventors: Mianwei Zhou, Santa Clara, CA (US);
Yibo Chen, San Jose, CA (US);
Abhishek Bhatia, Savoy, IL (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,660

(22) Filed: Apr. 30, 2024

(65) Prior Publication Data

US 2024/0282124 A1 Aug. 22, 2024

Related U.S. Application Data

(63) Continuation of application No. 17/982,144, filed on Nov. 7, 2022, now Pat. No. 12,014,555.

(51) Int. Cl.
| | |
|---|---|
| *G06V 20/56* | (2022.01) |
| *G06V 10/44* | (2022.01) |
| *G06V 10/774* | (2022.01) |

(52) U.S. Cl.
CPC ............ *G06V 20/588* (2022.01); *G06V 10/44* (2022.01); *G06V 10/7747* (2022.01)

(58) Field of Classification Search
CPC .. G06V 20/588; G06V 10/7747; G06V 10/44; G06V 10/764
See application file for complete search history.

(56) References Cited

U.S. PATENT DOCUMENTS

| | | | | |
|---|---|---|---|---|
| 10,282,997 | B2 * | 5/2019 | Gignac ................. | G08G 1/167 |
| 10,900,793 | B2 * | 1/2021 | Jung ..................... | G08G 1/137 |
| 11,113,544 | B2 * | 9/2021 | Lee ........................... | G06T 7/11 |
| 11,734,832 | B1 * | 8/2023 | Morales Morales .... | G06N 3/08 |
| | | | | 382/103 |
| 2010/0289632 | A1 * | 11/2010 | Seder .................... | G01S 13/931 |
| | | | | 382/104 |
| 2019/0034740 | A1 * | 1/2019 | Kwant ................. | G06V 10/462 |
| 2019/0063945 | A1 * | 2/2019 | Liu ..................... | G01C 21/3658 |

(Continued)

FOREIGN PATENT DOCUMENTS

| | | |
|---|---|---|
| CN | 106844977 A | 6/2017 |
| CN | 110503009 A | 11/2019 |

(Continued)

OTHER PUBLICATIONS

Kang, Seung-Nam, et al., "Multi-Lane Detection Based on Accurate Geometric Lane Estimation in Highway Scenarios"; 2014 IEEE Intelligent Vehicles Symposium (IV), Jun. 8-11, 2014 (Year: 2014), pp. 221-226.

*Primary Examiner* — Shaghayegh Azima
(74) *Attorney, Agent, or Firm* — Rimon Law, P.C.

(57) ABSTRACT

Methods, systems, and non-transitory computer-readable media are configured to perform operations comprising determining lane detection data and object detection data associated with an environment; determining a lane template based on the lane detection data; and generating localization data that identifies a location of an object in the environment based on the lane template and the object detection data.

20 Claims, 8 Drawing Sheets

500

Determine lane detection data and object detection data associated with an environment
502

Determine a lane template based on the lane detection data
504

Generate localization data that identifies a location of an object in the environment based on the lane template and the object detection data
506

(56)                    References Cited

U.S. PATENT DOCUMENTS

| | | | | |
|---|---|---|---|---|
| 2019/0066512 | A1* | 2/2019 | Liu | G06V 20/588 |
| 2019/0294934 | A1* | 9/2019 | Shestak | G06V 20/588 |
| 2019/0311205 | A1* | 10/2019 | Mittal | G06F 18/214 |
| 2020/0094849 | A1* | 3/2020 | Weber | B60W 50/0225 |
| 2020/0110175 | A1* | 4/2020 | Chen | G01S 17/04 |
| 2020/0132497 | A1* | 4/2020 | Glebov | G07C 5/008 |
| 2020/0217685 | A1* | 7/2020 | Koh | G01C 21/3602 |
| 2020/0302189 | A1* | 9/2020 | Shu | G06V 10/82 |
| 2021/0201051 | A1* | 7/2021 | Deselaers | B60W 30/18163 |
| 2021/0276547 | A1* | 9/2021 | Narayanan | G06F 18/24137 |
| 2021/0383616 | A1* | 12/2021 | Rong | G06N 3/0464 |
| 2022/0105963 | A1* | 4/2022 | Costa | B60W 60/0015 |
| 2022/0146277 | A1* | 5/2022 | Lambert | G05D 1/0231 |
| 2022/0164582 | A1* | 5/2022 | Raghavan | G06N 3/0895 |
| 2022/0164584 | A1* | 5/2022 | Singal | G06V 10/44 |
| 2022/0165072 | A1* | 5/2022 | S. | G06V 10/764 |
| 2022/0180644 | A1* | 6/2022 | Awasthi | G06V 20/588 |
| 2022/0274625 | A1* | 9/2022 | Garimella | G06N 3/044 |
| 2024/0142241 | A1* | 5/2024 | Choi | G08G 1/04 |

FOREIGN PATENT DOCUMENTS

| | | | | | |
|---|---|---|---|---|---|
| CN | 114255317 | A | | 3/2022 | |
| CN | 117726084 | | * | 3/2024 | |
| CN | 117726084 | A | * | 3/2024 | |
| KR | 20180113294 | A | * | 10/2018 | G06K 9/4633 |

* cited by examiner

100

Lane Template Localization Module 102

Lane Template Evaluation Module
108

Lane Detection Data 104

Localization Module
110

Localization
Data
116

Object Detection Data 106

Lane Template Training Module
112

200

Image Data with Lane Detection and Object Detection 202a

Image Data with Lane Detection and Object Detection 202b

Lane Template Localization Model 204

Lane Template Database 206

Ego and Surrounding Vehicle Localization 208a

Ego and Surrounding Vehicle Localization 208b

500

Determine lane detection data and object detection data
associated with an environment
502

Determine a lane template based on the lane detection data
504

Generate localization data that identifies a location of an object in
the environment based on the lane template and the object
detection data
506

Vehicle 600

Autonomous System
610

Perception
Module 612

Prediction and
Planning Module
616

Data
Store 620

Localization
Module 614

Control Module
618

VEHICLE LOCALIZATION BASED ON LANE TEMPLATES

CROSS-REFERENCE TO RELATED APPLICATIONS

This application is a continuation of U.S. patent application Ser. No. 17/982,144, filed on Nov. 7, 2022, and entitled "VEHICLE LOCALIZATION BASED ON LANE TEMPLATES", which is incorporated in its entirety herein by reference.

FIELD OF THE INVENTION

The present technology relates to autonomous systems. More particularly, the present technology relates to machine learning models that may be used in vehicle autonomous systems.

BACKGROUND

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment change.

SUMMARY

Various embodiments of the present technology can include methods, systems, and non-transitory computer readable media configured to perform operations comprising determining lane detection data and object detection data associated with an environment; determining a lane template based on the lane detection data; and generating localization data that identifies a location of an object in the environment based on the lane template and the object detection data.

In some embodiments, the lane detection data and the object detection data are determined based on image data captured at the environment, and wherein the localization data identifies a location of a vehicle that captured the image data at the environment.

In some embodiments, the lane template includes a lane layout that corresponds with the environment.

In some embodiments, the lane template is determined based on a set of lane templates, and wherein the set of lane templates is predefined based on lane layouts.

In some embodiments, the lane template is determined based on a machine learning model.

In some embodiments, an instance of training data for training the machine learning model is generated based on an application of a simulated vehicle and a simulated object to a selected lane template.

In some embodiments, the instance of training data is based on an application of at least one of: a simulated variation in lane curvature, a simulated variation in map elevation, or a simulated variation in lane width.

In some embodiments, the instance of training data is based on a projection of the selected lane template to an image.

In some embodiments, the lane detection data includes data that describes lane markings detected at the environment and the object detection data includes data that describes objects detected at the environment.

In some embodiments, the localization data includes at least one of: a machine-readable map or a birds eye view of the environment.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
FIG. 1 illustrates an example system associated with lane template localization, according to embodiments of the present technology.
Figure 1:
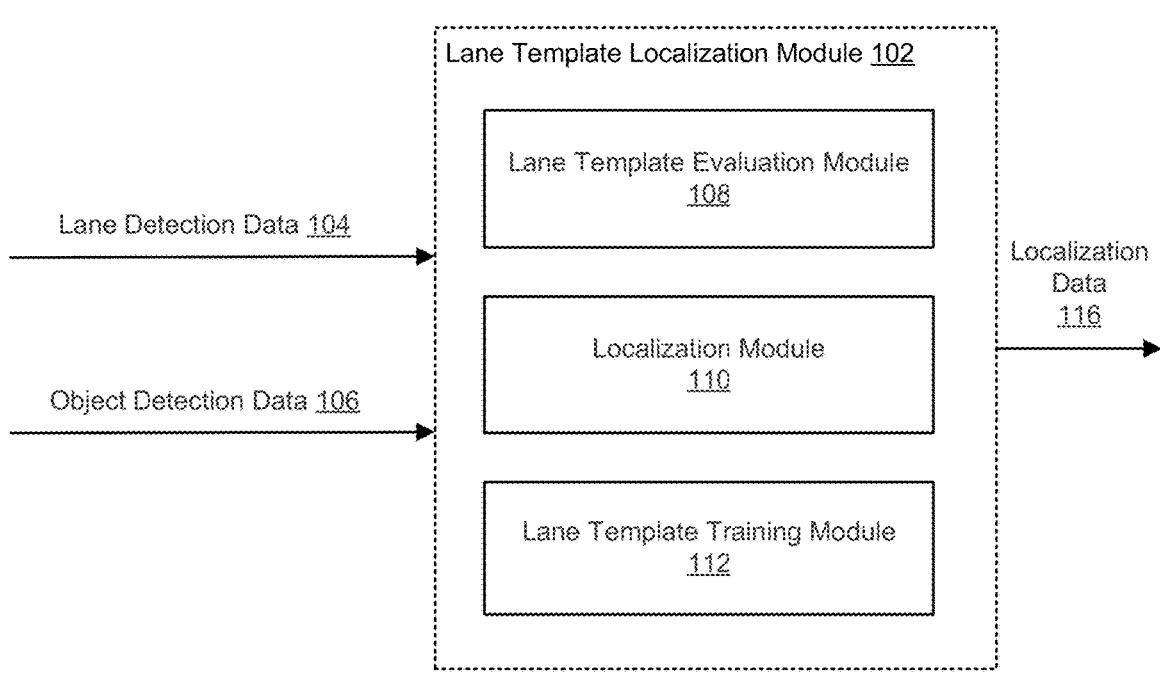

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Vehicle Localization Based on Lane Templates

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment change.

Understanding an environment in which a vehicle having an autonomous system of navigation (e.g., ego vehicle) is traveling is fundamental to planning and control functions of the vehicle. For example, a truck traveling in an environment can plan a safe route to travel in the environment based on an understanding of the environment. The understanding of the environment can involve detecting various boundaries (e.g., lane boundaries). The understanding of the environment can also involve detecting and localizing objects such as other vehicles, pedestrians, traffic signals, etc. In many cases, a vehicle relies on machine learning models to facilitate understanding of an environment in which the vehicle is traveling. For example, a truck can rely on a machine learning model to detect lane boundaries in an environment.

The truck can also rely on a machine learning model to detect other vehicles in the environment. In this example, the truck can localize the truck and the other vehicles in the environment with the detected lane boundaries. The truck can also plan a safe route to travel within the lane boundaries while maintaining a safe distance relative to the other vehicles.

However, under conventional approaches, localization of a vehicle and other objects in an environment with detected lane boundaries poses various technological challenges. In some cases, lane boundaries in an environment may not be readily detected. For example, the lane boundaries may be occluded by other objects in the environment. In some cases, detected lane boundaries do not produce an accurate lane layout for an environment. For example, curvatures in a road may result in detected lane boundaries that are inaccurately curved when, in reality, the actual lane boundaries are actually straight. In these cases, localization of a vehicle and other objects in an environment may fail as the environment is not accurately determined. As a result, the vehicle relying on the machine learning model to localize itself and other objects in the environment may be unable to plan a safe route through the environment due to the failed localization. Thus, conventional approaches that fail to accurately localize vehicles and other objects in an environment can pose significant technological challenges.

The present technology provides improved approaches for localization of a vehicle and other objects in an environment that overcome the aforementioned and other technological challenges. In various embodiments, the present technology can localize a vehicle and other objects in a lane template associated with an environment. The lane template can be determined based on detected lane boundaries associated with the environment. A machine learning model can be trained to classify the detected lane boundaries into or as a lane template for an environment and localize a vehicle and other objects based on the lane template. The machine learning model can be trained based on training data that includes lane detections and object detections associated with an environment. Based on the lane detections and the object detections, the machine learning model can be trained to localize a vehicle and other objects on or in a lane template. For example, the machine learning model can be trained to generate a machine-readable local map that includes lane boundaries associated with a lane template, a vehicle localized on the lane template, and other objects localized on the lane template. Once trained, the machine learning model can be applied to detected lane boundaries and detected objects associated with an environment. The machine learning model can classify the lane detections into or as a lane template for the environment. The machine learning model can localize a vehicle and other objects on the lane template. For example, a vehicle in an environment can capture image data of the environment. Based on the image data, lane boundaries and other objects in the environment can be detected. The detected lane boundaries and the detected objects can be provided to a trained machine learning model. The machine learning model can classify the detected lane boundaries into a lane template for the environment. The machine learning model can localize the vehicle and localize the detected objects on the lane template. The machine learning model can generate a machine-readable local map based on the lane template, the localized vehicle, and the localized detected objects. In this example, the vehicle can plan a safe route to travel within the lane boundaries of the environment while maintaining a safe distance relative to the other objects. Thus, the present technology provides improved approaches for localization of a vehicle and other objects in an environment. These and other inventive features and related advantages of the various embodiments of the present technology are discussed in more detail herein.

FIG. 1 illustrates an example system 100 including a lane template localization module 102, according to some embodiments of the present technology. In some embodiments, the lane template localization module 102 can provide support for various functions of an autonomous system of navigation of any type of vehicle, such as a truck. The lane template localization module 102 can generate localization data 116. The localization data 116 can include, for example, a machine-readable local map that includes lane boundaries for an environment, and localization of a vehicle and other objects. The localization data 116 can support or be implemented as part of a perception function of an autonomous system of a vehicle, such as a perception module 612 of an autonomous system 610 of FIG. 6, as discussed in more detail below. Alternatively or additionally, the localization data 116 can support or be implemented as part of a prediction and planning function of an autonomous system of a vehicle, such as a prediction and planning module 616 of an autonomous system 610 of FIG. 6, as discussed in more detail below. The lane template localization module 102 can generate the localization data 116 based on various data, such as lane detection data 104 and object detection data 106, which are discussed in more detail below. The lane template localization module 102 can generate the localization data 116 based on various machine learning methodologies. For example, the lane template localization module 102 can train a machine learning model to generate the localization data 116 based on the lane detection data 104 and the object detection data 106. While localization of a vehicle and other objects in an environment with lane boundaries is discussed herein as an example application of the present technology, various other applications are possible in accordance with the present technology.

In some embodiments, some or all of the functionality performed by the lane template localization module 102 may be performed by one or more computing systems implemented in a vehicle. In some embodiments, some or all of the functionality performed by the lane template localization module 102 may be performed by one or more computing systems. In some embodiments, some or all of the functionality performed by the lane template localization module 102 may be performed by one or more backend computing systems (e.g., remote from a vehicle). In some embodiments, some or all of the functionality performed by the lane template localization module 102 may be performed by one or more computing systems associated with (e.g., carried by) one or more users riding in a vehicle. In some embodiments, some or all data processed and/or stored by the lane template localization module 102 can be stored in a data store (e.g., local to the lane template localization module 102) or other storage system (e.g., cloud storage remote from lane template localization module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the lane template localization module 102 can be implemented in any suitable combinations. Functionalities of the lane template localization module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The lane template localization module 102 can include a lane template evaluation module 108. The lane template evaluation module 108 can determine a lane template for an environment based on lane detection data 104. The lane detection data 104 can include data that describes lane boundaries detected in the environment. For example, the lane detection data 104 can include data describing lane markings (e.g., solid lane markings, dashed lane markings) detected from image data captured at the environment by, for example, a camera on a vehicle for which localization is to be determined. The lane template evaluation module 108 can classify the lane detection data 104 into a lane template for the environment. Classification of the lane detection data 104 can be based on various factors. The various factors can include, for example, distance between lane markings, types of lane markings, number of lane markings, curvature of lane markings, length of lane markings, etc. The lane template evaluation module 108 can classify the lane detection data 104 into a lane template from a set of lane templates. The set of lane templates can include lane templates for different lane layouts. The different lane layouts can correspond with different road situations that may be encountered. For example, the set of lane templates can include lane templates for single lane roads or multiple lane roads, such as a four lane road, a three lane road, or a two lane road. The set of lane templates can also include lane templates for roads with merges or splits, such as a five lane road with a two lane merge, a four lane road with a one lane merge, a four lane road with a two lane split, or a three lane road with a one lane split. In some cases, the set of lane templates can also include lane templates for road intersections and roads with different features, such as turning lanes, motorcycle lanes, or bicycle lanes. A lane template determined by the lane template evaluation module 108 can provide a lane layout in a format appropriate for vehicle navigation or other purposes. In some cases, a lane template can provide a lane layout as a machine-readable map. The machine-readable map can include indications of lane boundaries corresponding with the lane layout. In some cases, a lane template can include a birds eye view of a lane layout. The birds eye view can include a top down view of lane boundaries corresponding with the lane layout. Many variations are possible.

In various embodiments, lane templates can be defined by or correspond to various lane layouts that may be encountered in various real world environments involving actual roads. For example, common highway environments may include five lane roads, four lane roads, three lane roads, and two lane roads. Common highway environments may also include roads with merges and splits. Lane templates for the various lane layouts that may be encountered can be generated using a design tool or design language. After they are defined and generated, lane templates can be stored in a lane template database. A lane template that matches a detected environment can be selected from the lane template database. Many variations are possible.

The lane template evaluation module 108 can determine a lane template for an environment based on a machine learning model. The machine learning model can be trained to classify lane detection data 104 into a lane template. The lane detection data 104 can include data describing lane markings detected at an environment. The data describing the lane markings detected at the environment can be provided to the machine learning model. The machine learning model can classify the data describing the lane markings detected at the environment into a lane template with a lane layout that corresponds with the lane markings detected at the environment. For example, a vehicle navigating an environment can capture image data of the environment. Lane markings in the environment can be detected based on the captured image data. The detected lane markings can be provided to a machine learning model. The machine learning model can classify the detected lane markings into a lane template corresponding with the environment. For example, the machine learning model can classify the environment as a five lane road based on the detected lane markings. The machine learning model can provide a lane template of a five lane road based on the classification of the detected lane markings. In this example, the lane template provided by the machine learning model can include a machine-readable map with lane boundaries corresponding with a five lane road. Many variations are possible.

The lane template localization module 102 can include a localization module 110. The localization module 110 can localize a vehicle (e.g., ego vehicle) and other objects (e.g., other vehicles) on or within a lane template. The localization module 110 can localize the vehicle and the other objects on the lane template based on lane detection data 104 and object detection data 106. The lane detection data 104 can include data that describes lane boundaries detected in an environment. The object detection data 106 can include data that describe objects detected in the environment. For example, the lane detection data 104 for an environment can include data describing lane markings (e.g., solid lane markings, dashed lane markings) detected from image data captured at the environment. The object detection data 106 can include bounding boxes indicating locations of objects detected in the image data captured at the environment. Based on the lane detection data 104 and the object detection data 106, the localization module 110 can localize a vehicle and other objects on a lane template. Locations of the vehicle and the other objects in an environment can be indicated on the lane template. For example, in cases where the lane template includes a machine-readable map of an environment, the machine-readable map can include indications of where a vehicle and other objects are located in the environment. In cases where the lane template includes a birds eye view of the environment, the birds eye view can also include indications of where the vehicle and the other objects are located in the environment. Many variations are possible.

The localization module 110 can localize a vehicle (e.g., ego vehicle) based on the lane detection data 104. The lane detection data 104 can include data describing lane markings detected in image data captured at an environment. The image data can be captured, for example, by a camera on the vehicle. The localization module 110 can determine a location of the camera relative to the environment based on the lane markings detected in the image data. The localization module 110 can determine a location of the vehicle based on the location of the camera. For example, a vehicle navigating an environment can have a camera that captures image data of the environment. Lane markings in the environment can be detected based on the captured image data. The localization module 110 can determine a location of the camera based on the lane markings. For example, the localization module 110 can determine that the camera is located in the left most lane of a four lane road based on the lane markings. The localization module 110 can determine the vehicle is located in the left most lane of the four lane road based on the location of the camera. Many variations are possible.

The localization module 110 can localize other objects (e.g., other vehicles) based on the object detection data 106. The object detection data 106 can include data describing locations of objects detected in image data captured at an environment. The data can include, for example, bounding boxes that indicate the locations in the image data of the objects detected in the image data. The image data can be captured, for example, by a camera on the vehicle. The localization module 110 can determine locations of the objects relative to the environment based on the locations of the objects in the image data. The localization module 110 can determine locations of objects detected in the image data relative to a camera that captured the image data based on the locations of the objects in the image data, which can be indicated by bounding boxes. Based on the locations of the objects relative to the camera, the localization module 110 can determine locations of the objects relative to an environment. For example, a vehicle navigating an environment can have a camera that captures image data of the environment. Objects, such as other vehicles, in the environment can be detected based on the captured image data. The localization module 110 can determine locations of the other vehicles relative to the camera based on locations of the other vehicles in the captured image data. The localization module 110 can determine locations of the other vehicles relative to the vehicle based on the locations of the other vehicles relative to the camera. For example, the localization module 110 can determine that a first vehicle of the other vehicles is in a right most lane of a three lane road based on where the first vehicle is located in the captured image data. Many variations are possible.

The localization module 110 can localize a vehicle (e.g., ego vehicle) and other objects (e.g., other vehicles) based on a machine learning model. The machine learning model can be trained to localize the vehicle and the other objects on a lane template. The machine learning model can localize the vehicle and the other objects on the lane template based on lane detection data 104, object detection data 106, and the lane template. The lane detection data 104 can include data that describes lane boundaries detected in an environment. The object detection data 106 can include data that describes locations of objects detected at the environment. The lane template can include data that describes a lane layout of the environment. The machine learning model can provide an indication on the lane template that corresponds with where the vehicle is located in the environment. The machine learning model can further provide indications on the lane template that correspond with where the other objects are located in the environment. For example, the machine learning model can be provided with a lane template of a five lane road. The machine learning model can provide an indication on the lane template that corresponds with where a vehicle is located on the five lane road. The machine learning model can further provide indications on the lane template that correspond with where other objects are located on the five lane road. Many variations are possible.

In various embodiments, the various functions described with respect to the localization module 110 and the lane template evaluation module 108 can be performed by one machine learning model. In some cases, the various functions can be performed by different machine learning models. The different machine learning models can be separately trained and perform specific tasks for which they were trained. In some cases, the machine learning models can be trained to perform different functions and share architecture through which common data is provided. Many variations are possible.

The lane template localization module 102 can include a lane template training module 112. The lane template training module 112 can train a machine learning model to classify lane detection data 104 into a lane template. The lane template training module 112 can also train the machine learning model to localize a vehicle (e.g., ego vehicle) and other objects (e.g., other vehicles) on the lane template. The machine learning model can be trained based on training data. An instance of training data can be generated in a variety of ways, such as capturing data from a real world environment or generating it through simulation. The instance of training data can include lane detection data and object detection data that correspond with an image of an environment. The instance of training data can be associated with a lane template that has a vehicle and other objects localized on the lane template. The vehicle and the other objects can be localized on the lane template in accordance with the lane detection data and the object detection data. The instance of training data can be provided to the machine learning model. The output generated by the machine learning model can be compared with the lane template that has the vehicle and the other objects localized on the lane template. As multiple instances of training data are provided to the machine learning model, the machine learning model can be trained based on a minimization of a loss function associated with outputs generated by the machine learning model and the instances of training data (e.g., through backpropagation). Through training of the machine learning model, the machine learning model can learn to classify lane detection data into lane templates and to localize vehicles and other objects on the lane templates. Many variations are possible.

In some cases, an instance of training data can be based on data captured at an environment. Lane detection data associated with the instance of training data can be based on detections of lane markings in image data captured at the environment. Object detection data associated with the instance of training data can be based on detections of objects in the image data captured at the environment. A lane template associated with the instance of training data can be selected and a vehicle and other objects associated with the instance of training data can be localized on the selected lane template. In some cases, an instance of training data can be generated based on a lane template. A lane template for which an instance of training data is to be generated can be selected. A vehicle and other objects can be included in the lane template. The vehicle and the other objects can, for example, be located at random locations on the lane template. Simulated variations can be applied to the lane template. The variations can include, for example, variations in lane curvature, variations in map elevation, and variations in lane width. For example, curvatures of various degrees can be applied to the lane template as modified to simulate lane curvature or map elevation. Offsets of various degrees can be applied to the lane template as modified to simulate variation in lane width. The modified lane template can be projected to an image to generate the instance of training data. The instance of training data can include lane detection data and the object detection data associated with the image. In these cases, the instance of training data can be provided to a machine learning model. An output of the machine learning model can be compared with the lane template populated with the vehicle and the other objects to train the machine learning model. Many variations are possible.

In various embodiments, the lane template localization module 102 can generate localization data 116 based on a lane template and localization of a vehicle and other objects on the lane template. The localization data 116 can include the lane template, which can provide a lane layout of an environment. The localization data 116 can include indications on the lane template of where the vehicle and the other objects are located in the environment. The localization data 116 can provide the lane template and the indications of where the vehicle and the other objects as a machine-readable map or a birds eye view of the environment. The localization data 116 can be used by a perception system to determine where a vehicle (e.g., ego vehicle) is located in an environment. The perception system can use the localization data 116 to determine where other objects (e.g., other vehicles) are located in the environment. Navigation through the environment can be based on the locations of the vehicle and the other objects in the environment. In some cases, the localization data 116 can also be used by a planning system to plan a safe route through the environment. The planning system can plan the safe route through the environment based on the locations of the vehicle and the other objects in the environment. Many variations are possible.

Figure 2:
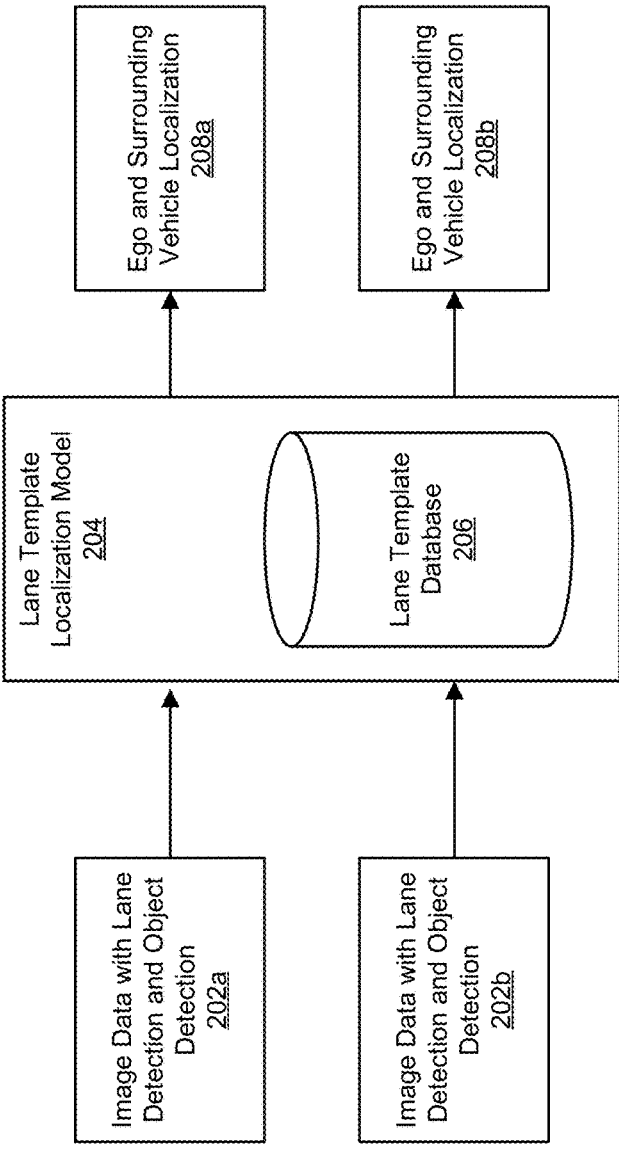
FIG. 2 illustrates an example block diagram associated with lane template localization, according to embodiments of the present technology.

FIG. 2 illustrates an example block diagram 200 associated with lane template localization, according to some embodiments of the present technology. The various functionality described herein for lane template localization can be performed by, for example, the lane template localization module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 2, image data with lane detection and object detection 202a, 202b can be provided to a lane template localization model 204. The image data can include images captured at an environment. The image data can include lane detection data that describes lane markings detected in the images. The image data can also include object detection data that describes objects detected in the images. Based on the image data with lane detection and object detection 202a, 202b, a lane template localization model 204 can classify the lane detection data to determine lane templates with lane layouts that correspond with the lane detection data. The lane template localization model 204 can determine the lane templates from a lane template database 206. The lane template database 206 can include predefined lane templates enumerated for or corresponding with the various lane layouts that can be encountered in various environments. The lane template localization model 204 can localize ego vehicles and surrounding vehicles on the lane templates based on the lane detection data and the object detection data. The lane template localization model 204 can generate ego and surrounding vehicle localization 208a, 208b. The ego and surrounding vehicle localization 208a, 208b can include the lane templates determined by the lane template localization model 204 and localizations of the ego vehicles and the surrounding vehicles on the lane templates. Many variations are possible.

Figure 3:
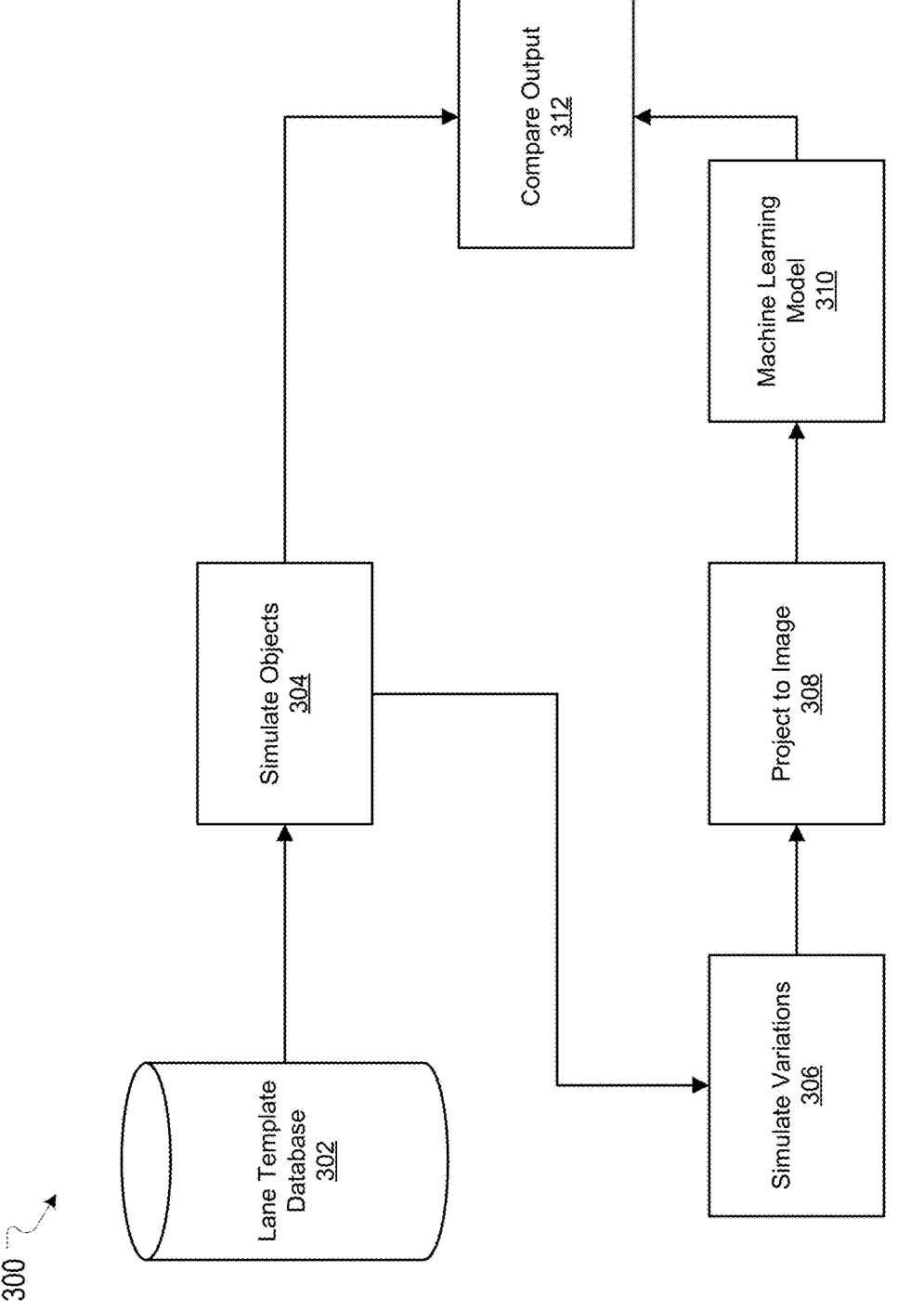
FIG. 3 illustrates an example block diagram associated with training a lane template localization model, according to embodiments of the present technology.

FIG. 3 illustrates an example block diagram 300 associated with training a lane template localization model, according to some embodiments of the present technology. In some embodiments, the various functionality described herein for training the lane template localization model can be performed by, for example, the lane template localization module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 3, lane templates can be obtained from a lane template database 302. The lane templates can be predefined based on various lane layouts that may be encountered in various environments. At 304, objects are generated and simulated for inclusion in a lane template from the lane template database 302. The objects simulated to be included in the lane template can include, for example, an ego vehicle and other objects, such as other vehicles. At 306, variations are also simulated for the lane template. The variations can include, for example, variations in lane curvature, variations in map elevation, and variations in land width. At 308, the lane template can be projected to an image. The lane template projected to the image can include the simulated objects and the simulated variations. The image can resemble an image that can be captured at an environment with a lane layout corresponding with the lane template. The image can be provided to a machine learning model 310. In this example, lane detection and object detection can be performed by the machine learning model 310 or the lane detection and the object detection can be provided to the machine learning model 310. The machine learning model 310 can generate a lane template with localized objects based on the lane detection and the object detection. At 312, the output of the machine learning model 310 (e.g., the lane template with the localized objects) is compared with the lane template with objects simulated for the lane template, which was generated at 304. The machine learning model 310 can be trained based on a minimization of a loss function associated with the output of the machine learning model and the lane template with objects simulated for the lane template. Many variations are possible.

Figure 4A:
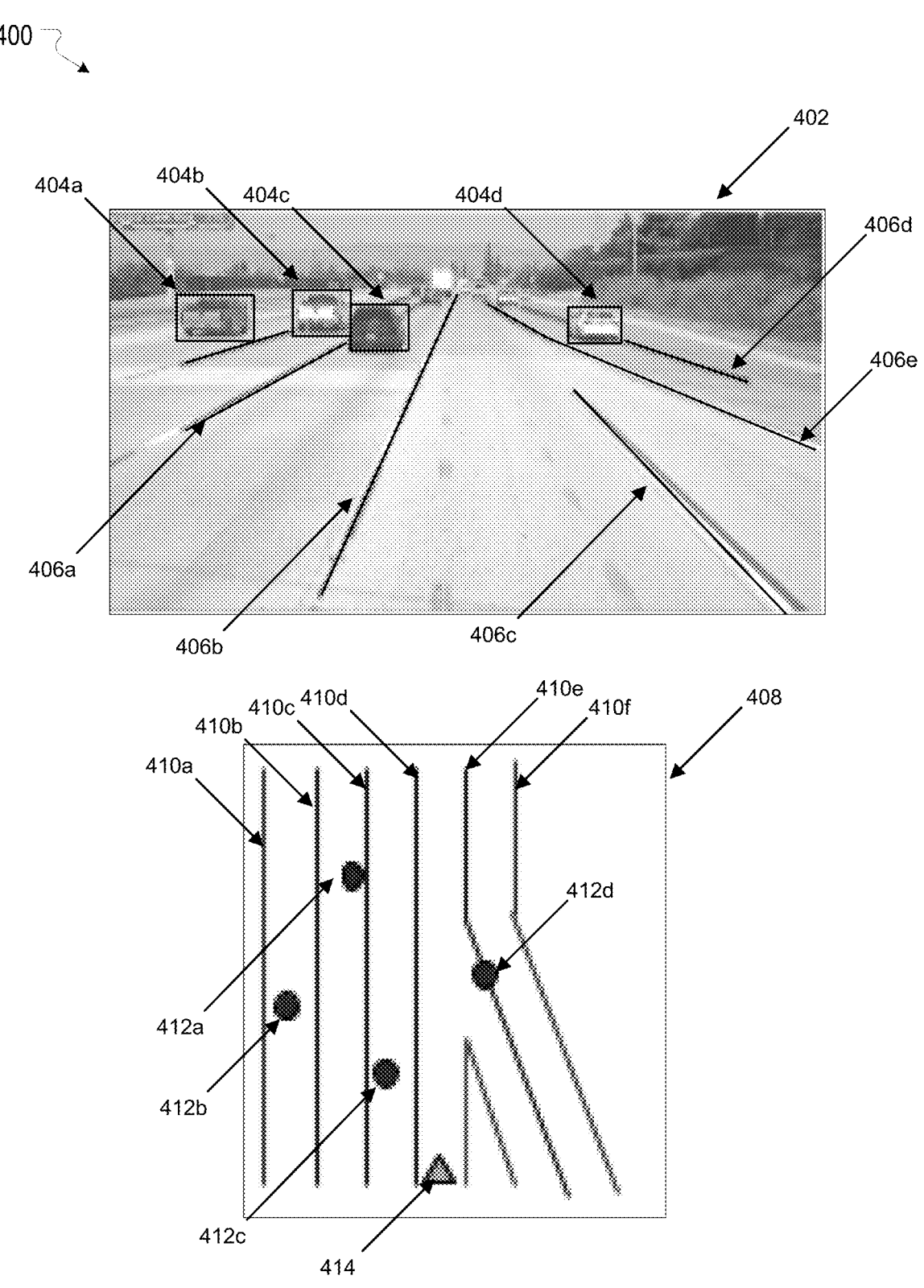
FIGS. 4A-4B illustrate examples of lane template localization, according to embodiments of the present technology.
Figure 4B:
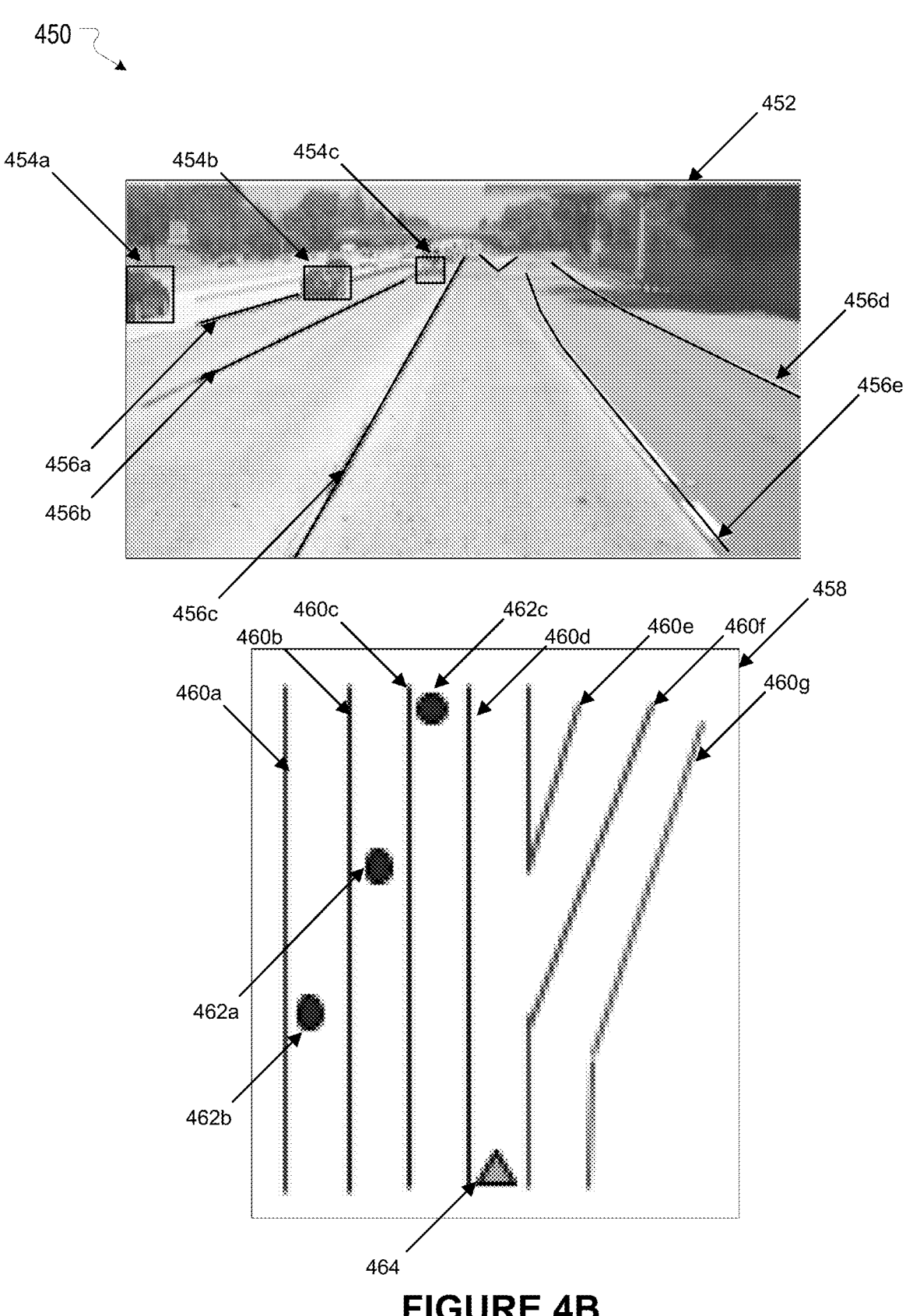

FIGS. 4A-4B illustrate examples of lane template localization, according to some embodiments of the present technology. The various functionality described herein for lane template localization can be performed by, for example, the lane template localization module 102 of FIG. 1. It should be understood that there can be additional, fewer, or alternative functionality or steps performed in similar or alternative orders, or in parallel, based on the various features and embodiments discussed herein unless otherwise stated.

FIG. 4A illustrates an example 400 of lane template localization. As illustrated in FIG. 4A, the example 400 includes an image 402 of a highway environment. The image 402 of the highway environment includes object detections 404a, 404b, 404c, 404d and lane detections 406a, 406b, 406c, 406d, 406e. The object detections 404a, 404b, 404c, 404d correspond with vehicles detected in the image 402. The lane detections 406a, 406b, 406c, 406d, 406e correspond with lane markings detected in the image 402. The example 400 includes localization data 408 that includes a lane template corresponding with the image 402. The localization data 408 includes lane boundaries 410a, 410b, 410c, 410d, 410e, 410f of a lane layout that corresponds with the lane detections 406a, 406b, 406c 406d, 406e of the image 402. The localization data 408 includes indications 412a, 412b, 412c, 412d of locations of the object detections 404a, 404b, 404c, 404d of the image 402. The localization data 408 includes an indication 414 of a location of an ego vehicle that captured the image 402. Many variations are possible.

FIG. 4B illustrates an example 450 of generating lane boundary information. As illustrated in FIG. 4B, the example 450 includes an image 452 of a highway environment. The image 452 of the highway environment includes object detections 454a, 454b, 454c and lane detections 456a, 456b, 456c, 456d, 456e. The object detections 454a, 454b, 454c correspond with vehicles detected in the image 452. The lane detections 456a, 456b, 456c, 456d, 456e correspond with lane markings detected in the image 452. The example 450 includes localization data 458 that includes a lane template corresponding with the image 452. The localization data 458 includes lane boundaries 460a, 460b, 460c, 460d, 460e, 460f, 460g of a lane layout that corresponds with the lane detections 456a, 456b, 456c, 456d, 456e of the image 452. The localization data 458 includes indications 462a, 462b, 462c of locations of the object detections 454a, 454b, 454c of the image 452. The localization data 458 includes an indication 464 of a location of an ego vehicle that captured the image 452. Many variations are possible.

Figure 5:
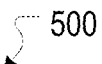
FIG. 5 illustrates an example method, according to embodiments of the present technology.
Figure 5:
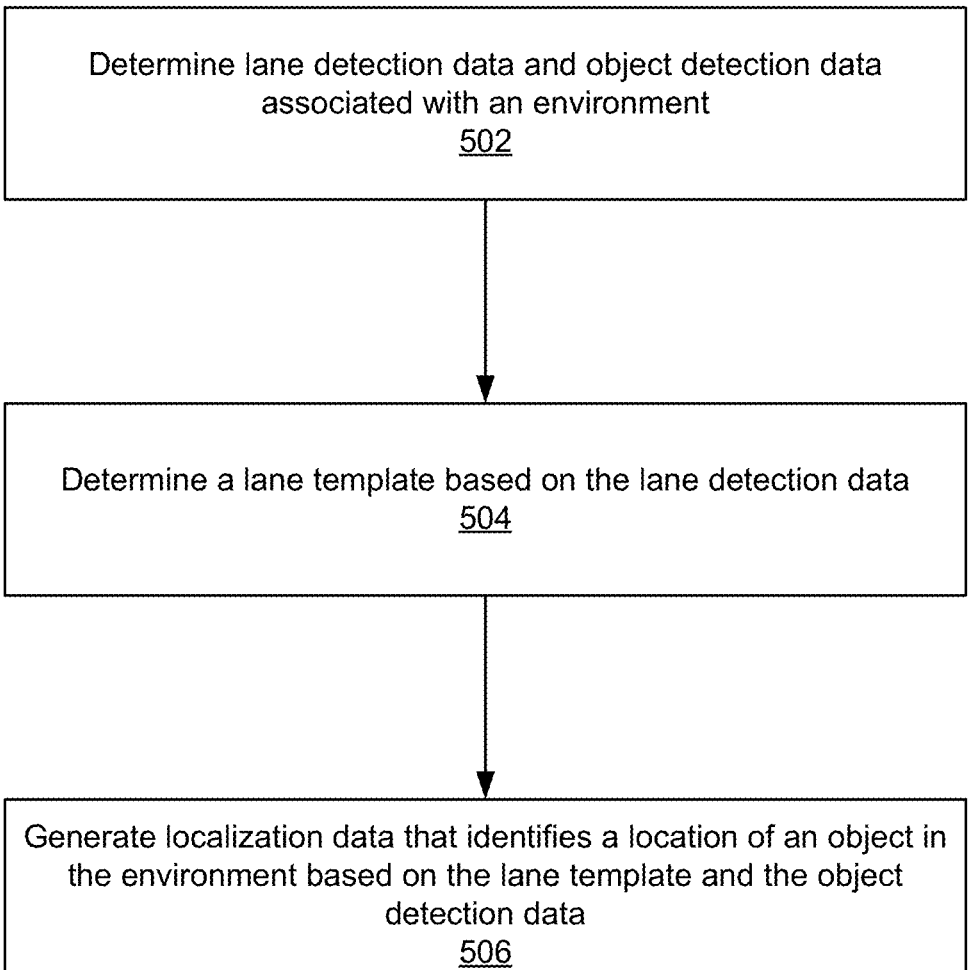

FIG. 5 illustrates an example method 500, according to embodiments of the present technology. At block 502, the example method 500 determines lane detection data and object detection data associated with an environment. At block 504, the example method 500 determines a lane template based on the lane detection data. At block 506, the example method 500 generates localization data that identifies a location of an object in the environment based on the lane template and the object detection data. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
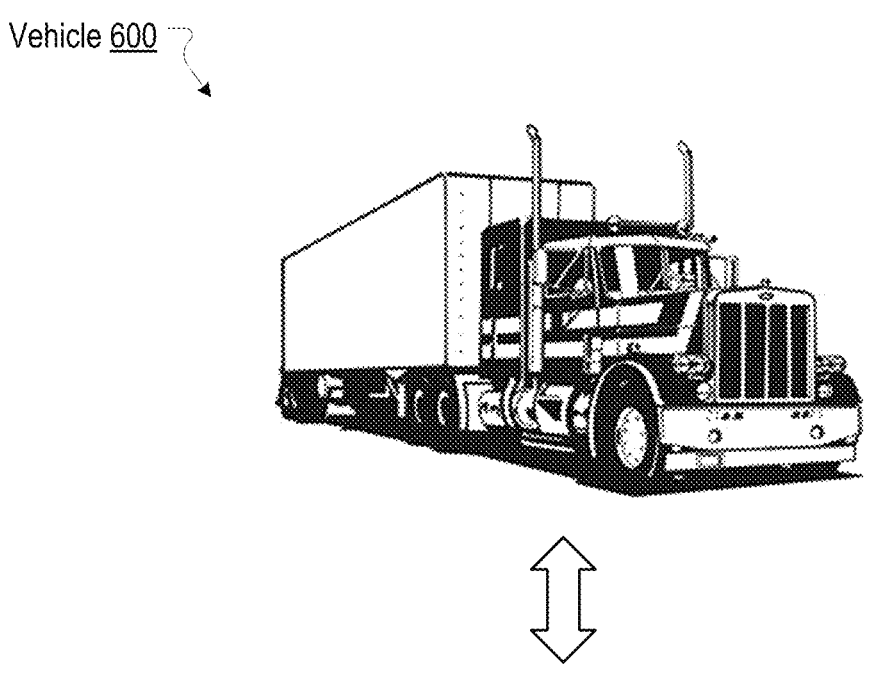
FIG. 6 illustrates an example vehicle, according to embodiments of the present technology.
Figure 6:
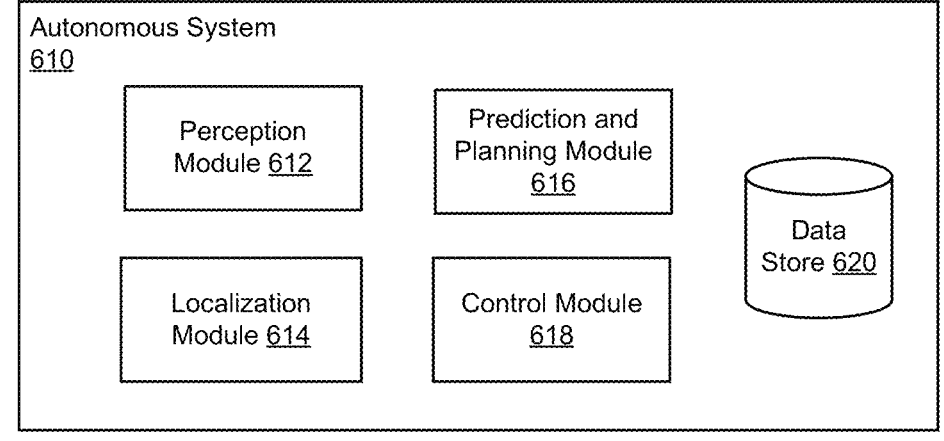

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 812 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is traveling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, localization data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
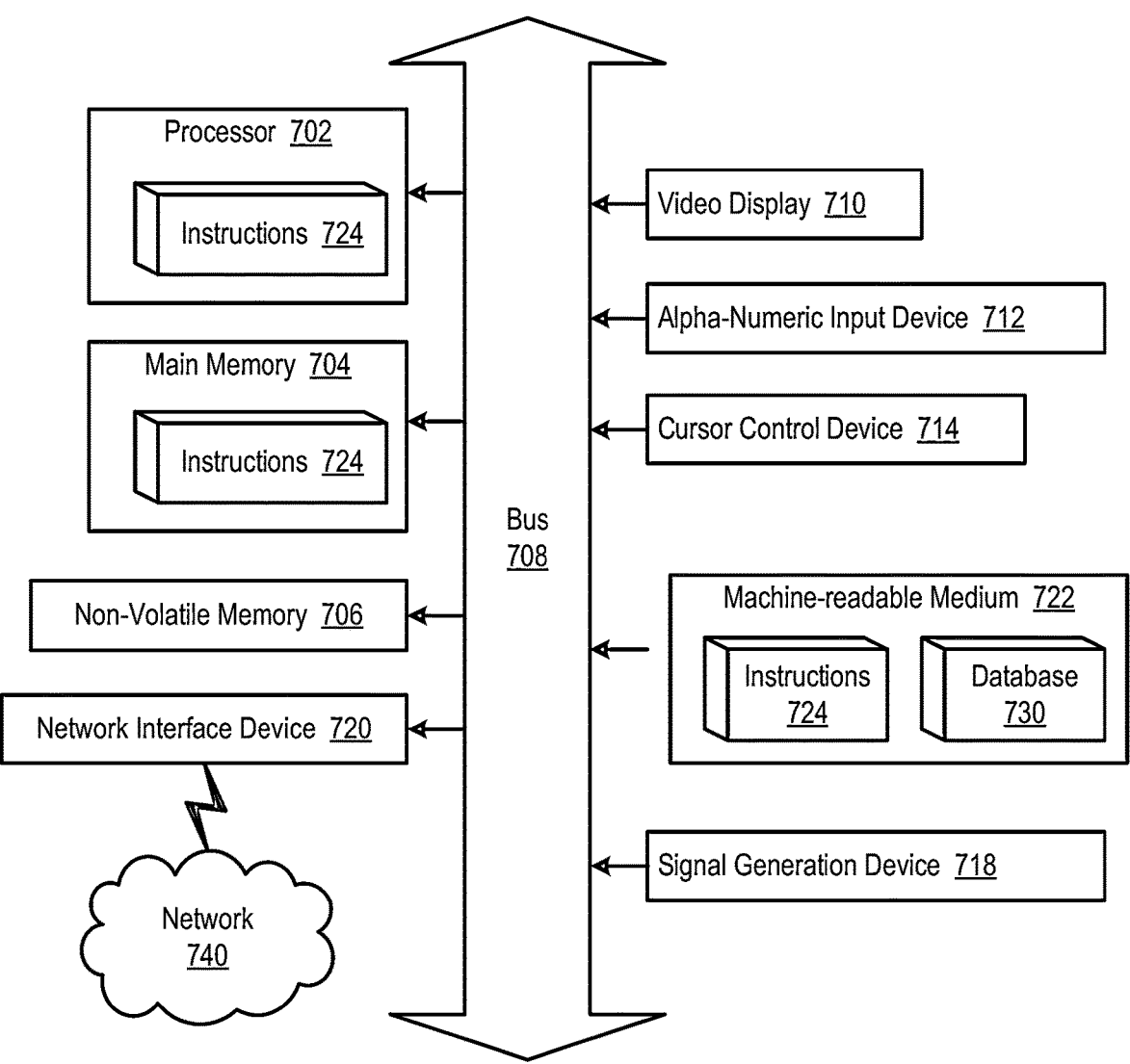
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. The machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 922 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
  capturing image data by a camera of a vehicle;
  based on a machine learning model trained to classify detection data into a lane template, selecting, by a computing system, based on detection data and the machine learning model, a lane template from a set of predefined lane templates, the detection data associated with an environment and including detected lane boundaries in the image data captured by the vehicle, the detection data based on the image data;
  determining, by the computing system, a first location of the vehicle in the environment and a second location of an object relative to the vehicle based on the detection data; and
  generating, by the computing system, localization data that identifies the first location of the vehicle and the second location of the object on the lane template.

2. The computer-implemented method of claim 1, wherein determining the first location of the vehicle in the environment and the second location of the object relative to the vehicle comprises:
  detecting, by the computing system, lane markings in the environment based on the detection data; and
  determining, by the computing system, a lane where the vehicle is located in the environment.

3. The computer-implemented method of claim 1, wherein determining the first location of the vehicle in the environment and the second location of the object relative to the vehicle comprises:
  detecting, by the computing system, the object in image data associated with the environment; and
  determining, by the computing system, the second location of the object relative to the vehicle based on a third location of the object in the image data.

4. The computer-implemented method of claim 1, wherein generating the localization data comprises:
  providing, by the computing system, a first indication on the lane template based on the first location of the vehicle in the environment; and
  providing, by the computing system, a second indication on the lane template, wherein the second indication is indicative of where the object is in the environment based on the second location of the object relative to the vehicle.

5. The computer-implemented method of claim 1, wherein determining the first location of the vehicle in the environment and the second location of the object relative to the vehicle is based on a second machine learning model, wherein a first indication that corresponds with the first location is provided on the lane template based on the second machine learning model, and wherein a second indication that corresponds with the second location is provided on the lane template based on the second machine learning model.

6. The computer-implemented method of claim 5, further comprising:
  generating, by the computing system, a first instance of training data for the second machine learning model based on the localization data and the detection data.

7. The computer-implemented method of claim 6, further comprising:
  simulating, by the computing system, a variation of the first instance of training data based on a modification of the second location of the object on the lane template; and
  generating, by the computing system, a second instance of training data for the second machine learning model based on the variation.

8. The computer-implemented method of claim 6, further comprising:
  comparing, by the computing system, an output of the second machine learning model with the lane template populated with the first location of the vehicle and the second location of the object.

9. The computer-implemented method of claim 1, wherein determining the first location of the vehicle in the environment and the second location of the object relative to the vehicle comprises:

indicating, by the computing system, the object in the detection data based on a bounding box.

10. The computer-implemented method of claim 1, further comprising:

providing, by the computing system, the localization data to a perception system, wherein the localization data causes the perception system to locate the vehicle and the object in the environment.

11. A system comprising:

at least one processor; and a memory storing instructions that, when executed, cause the system to perform operations comprising:

capturing image data by a camera of a vehicle;

based on a machine learning model trained to classify detection data into a lane template, selecting, based on detection data and the machine learning model, a lane template from a set of predefined lane templates, the detection data associated with an environment and including detected lane boundaries in the image data captured by the vehicle, the detection data based on the image data;

determining a first location of the vehicle in the environment and a second location of an object relative to the vehicle based on the detection data; and generating localization data that identifies the first location of the vehicle and the second location of the object on the lane template.

12. The system of claim 11, wherein determining the first location of the vehicle in the environment and the second location of the object relative to the vehicle comprises:

detecting lane markings in the environment based on the detection data; and determining a lane where the vehicle is located in the environment.

13. The system of claim 11, wherein determining the first location of the vehicle in the environment and the second location of the object relative to the vehicle comprises:

detecting the object in image data associated with the environment; and determining the second location of the object relative to the vehicle based on a third location of the object in the image data.

14. The system of claim 11, wherein generating the localization data comprises:

providing a first indication on the lane template based on the first location of the vehicle in the environment; and providing a second indication on the lane template, wherein the second indication is indicative of where the object is in the environment based on the second location of the object relative to the vehicle.

15. The system of claim 11, wherein determining the first location of the vehicle in the environment and the second location of the object relative to the vehicle is based on a second machine learning model, wherein a first indication that corresponds with the first location is provided on the lane template based on the second machine learning model, and wherein a second indication that corresponds with the second location is provided on the lane template based on the second machine learning model.

16. A non-transitory computer-readable storage medium including instructions that, when executed, cause a computing system to perform operations comprising:

capturing image data by a camera of a vehicle;

based on a machine learning model, selecting trained to classify detection data into a lane template, based on detection data and the machine learning model, a lane template from a set of predefined lane templates, the detection data associated with an environment and including detected lane boundaries in the image data captured by the vehicle, the detection data based on the image data;

determining a first location of the vehicle in the environment and a second location of an object relative to the vehicle based on the detection data; and generating localization data that identifies the first location of the vehicle and the second location of the object on the lane template.

17. The non-transitory computer-readable storage medium of claim 16, wherein determining the first location of the vehicle in the environment and the second location of the object relative to the vehicle comprises:

detecting lane markings in the environment based on the detection data; and determining a lane where the vehicle is located in the environment.

18. The non-transitory computer-readable storage medium of claim 16, wherein determining the first location of the vehicle in the environment and the second location of the object relative to the vehicle comprises:

detecting the object in image data associated with the environment; and determining the second location of the object relative to the vehicle based on a third location of the object in the image data.

19. The non-transitory computer-readable storage medium of claim 16, wherein generating the localization data comprises:

providing a first indication on the lane template based on the first location of the vehicle in the environment; and providing a second indication on the lane template, wherein the second indication is indicative of where the object is in the environment based on the second location of the object relative to the vehicle.

20. The computer-implemented method of claim 1, wherein the lane template is associated with a multi-lane road.

* * * * *